(12) United States Patent
Robbins et al.

(10) Patent No.: US 9,137,571 B2
(45) Date of Patent: *Sep. 15, 2015

(54) SHARING BEHAVIORAL PATTERNS BETWEEN DEVICES

(71) Applicant: AT&T Intellectual Property I, LP, Atlanta, GA (US)

(72) Inventors: William Stanley Robbins, Sun Prairie, WI (US); R. Tyler Wallis, Greenwood Village, CO (US); Anup D Karnalkar, Allen, TX (US); Mark Ryan, Norcross, GA (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/486,196

(22) Filed: Sep. 15, 2014

(65) Prior Publication Data
US 2015/0007205 A1    Jan. 1, 2015

Related U.S. Application Data

(63) Continuation of application No. 12/339,381, filed on Dec. 19, 2008, now Pat. No. 8,869,184.

(51) Int. Cl.
*H04N 21/25* (2011.01)
*H04N 21/258* (2011.01)
*H04N 21/442* (2011.01)
*H04N 7/16* (2011.01)
*H04N 21/433* (2011.01)
*H04N 21/436* (2011.01)
*H04N 21/47* (2011.01)
*H04N 21/472* (2011.01)
*H04N 21/478* (2011.01)
*H04N 21/482* (2011.01)
*H04L 29/08* (2006.01)
*H04N 21/488* (2011.01)

(52) U.S. Cl.
CPC .......... *H04N 21/44218* (2013.01); *H04L 67/10* (2013.01); *H04N 7/163* (2013.01); *H04N 21/4334* (2013.01); *H04N 21/43615* (2013.01); *H04N 21/44204* (2013.01); *H04N 21/47* (2013.01); *H04N 21/478* (2013.01); *H04N 21/47214* (2013.01); *H04N 21/488* (2013.01); *H04N 21/4826* (2013.01)

(58) Field of Classification Search
None
See application file for complete search history.

(56) References Cited

U.S. PATENT DOCUMENTS

| 7,039,699 | B1 | 5/2006 | Narin |
| 7,882,522 | B2 | 2/2011 | Neufeld et al. |
| 2002/0198786 | A1 | 12/2002 | Tripp et al. |
| 2005/0028207 | A1* | 2/2005 | Finseth et al. .................. 725/46 |

(Continued)

*Primary Examiner* — Brian T Pendleton
*Assistant Examiner* — Jean D Saint Cyr
(74) *Attorney, Agent, or Firm* — Guntin & Gust, PLC; Ed Guntin

(57) ABSTRACT

A system that incorporates teachings of the present disclosure may include, for example, a set-top box having a controller to present media content at a presentation device as directed by a user, monitor the media content consumed by the user, detect a first behavioral pattern based on the media content consumed by the user, transmit the detected first behavioral pattern to a communication device of the user, receive from the communication device a second behavioral pattern, and identify media content correlating to the second behavioral pattern. The communication device can be adapted to adjust communication operations according to the detected first behavioral pattern. Other embodiments are disclosed.

20 Claims, 7 Drawing Sheets

(56) References Cited

U.S. PATENT DOCUMENTS

| | | |
|---|---|---|
| 2006/0075420 A1 | 4/2006 | Ludvig et al. |
| 2007/0111726 A1* | 5/2007 | Lambert et al. ............ 455/432.1 |
| 2009/0133090 A1* | 5/2009 | Busse .......................... 725/132 |
| 2009/0276801 A1 | 11/2009 | Reece |

* cited by examiner

SHARING BEHAVIORAL PATTERNS BETWEEN DEVICES

CROSS-REFERENCE TO RELATED APPLICATION(S)

This application is a continuation of and claims priority to U.S. patent application Ser. No. 12/339,381 filed Dec. 19, 2008, the disclosure of which is hereby incorporated by reference in its entirety.

FIELD OF THE DISCLOSURE

The present disclosure relates generally to behavior detection techniques and more specifically to sharing behavioral patterns between devices.

BACKGROUND

There are many types of media devices today such as for example MP3 players, set-top boxes, DVD players, DVR recorders, CD players, and so on. Similarly, there are many types of communication devices available today such as for example landline phones, mobile phones, computers, and so on. It is common for users to program some or all of these devices with operational preferences to provide the user a desirable experience.

DETAILED DESCRIPTION

One embodiment of the present disclosure can entail a set-top box having a controller to present media content at a presentation device as directed by a user, monitor the media content consumed by the user, detect a first behavioral pattern based on the media content consumed by the user, transmit the detected first behavioral pattern to a communication device of the user, receive from the communication device a second behavioral pattern, and identify media content correlating to the second behavioral pattern. The communication device can be adapted to adjust communication operations according to the detected first behavioral pattern.

Another embodiment of the present disclosure can entail a computer-readable storage medium having computer instructions to monitor media content consumed by a user, detect a behavioral pattern based on the media content consumed by the user, and transmit the detected behavioral pattern to a communication device of the user operating independently of the storage medium.

Yet another embodiment of the present disclosure can entail a communication device having a controller to monitor communication activities of a user, detect a behavioral pattern from the monitored communication activities of the user, and transmit the detected behavioral pattern to a media processor. The media processor can be adapted to identify media content correlating to the behavioral pattern.

Figure 1:
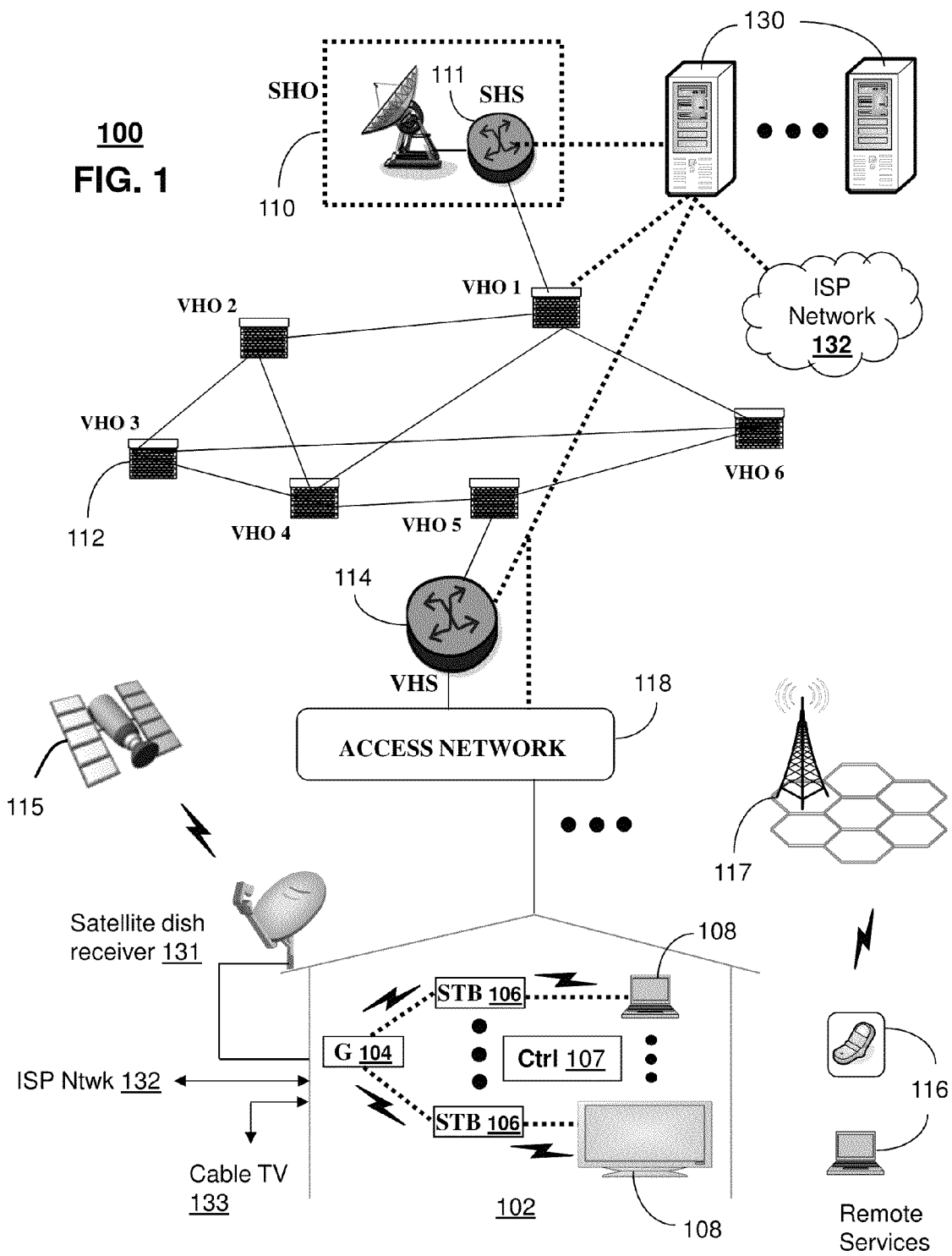
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
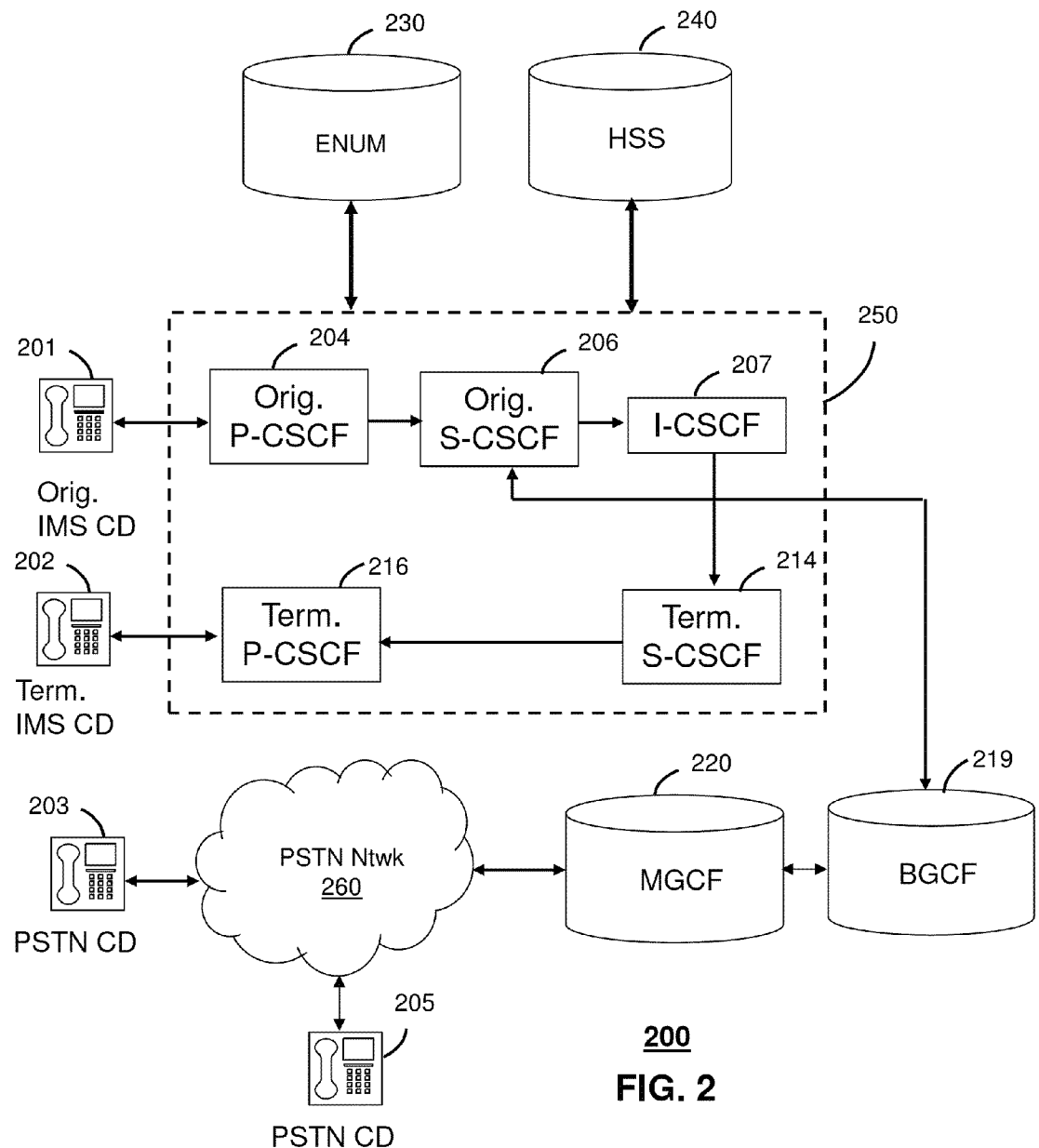

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
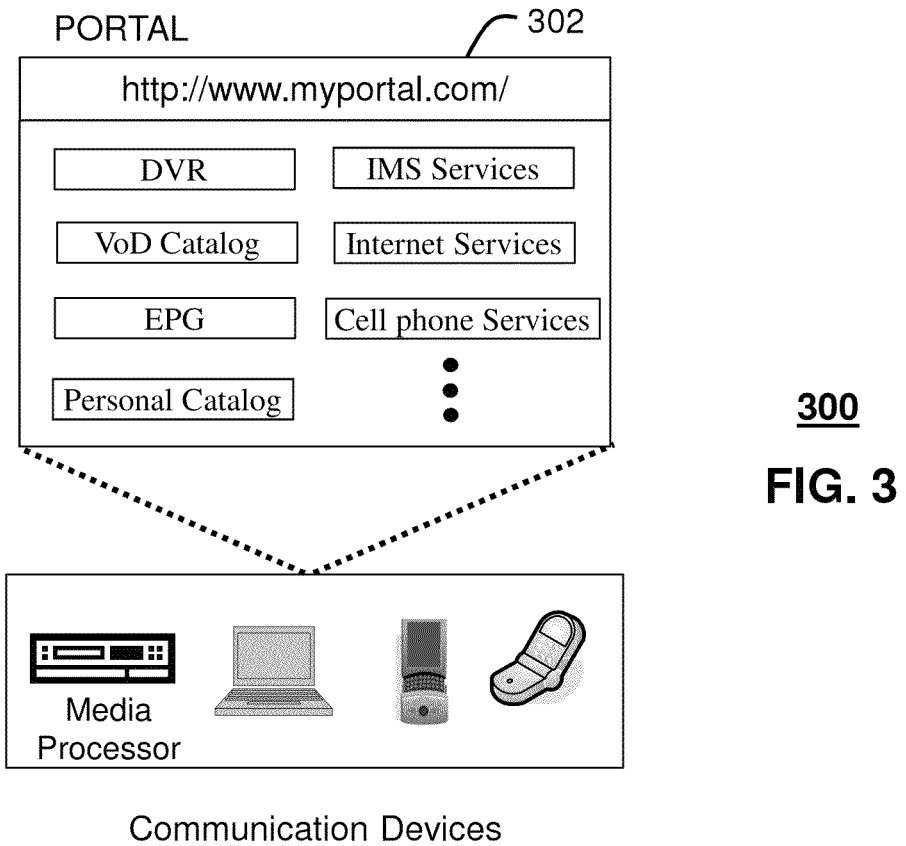
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
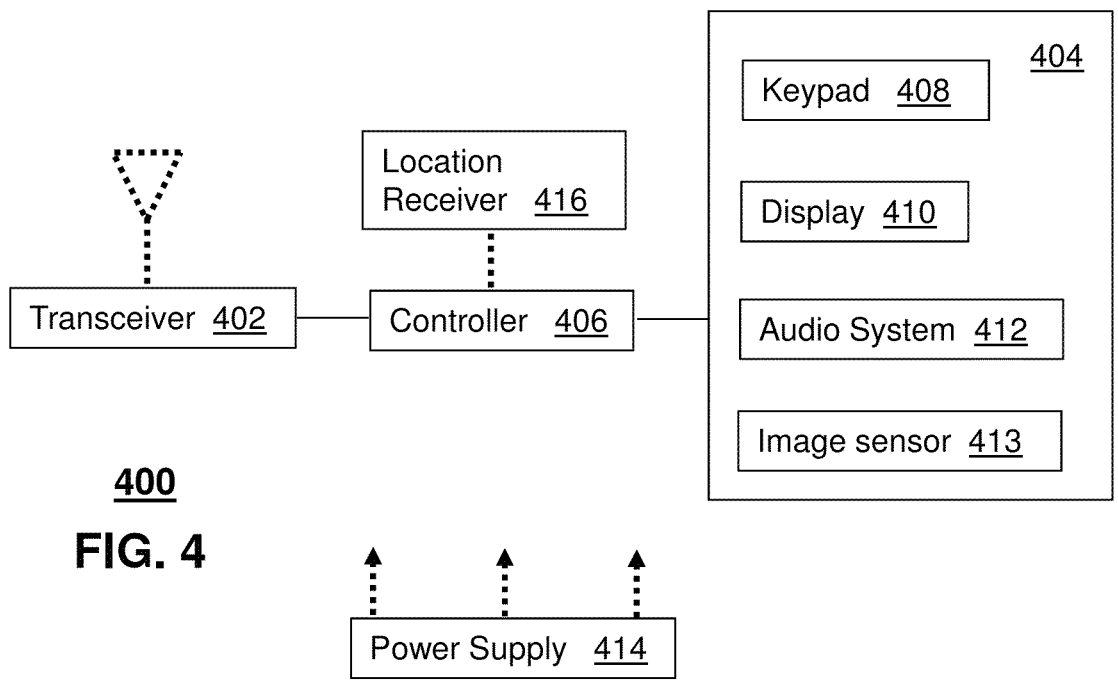
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
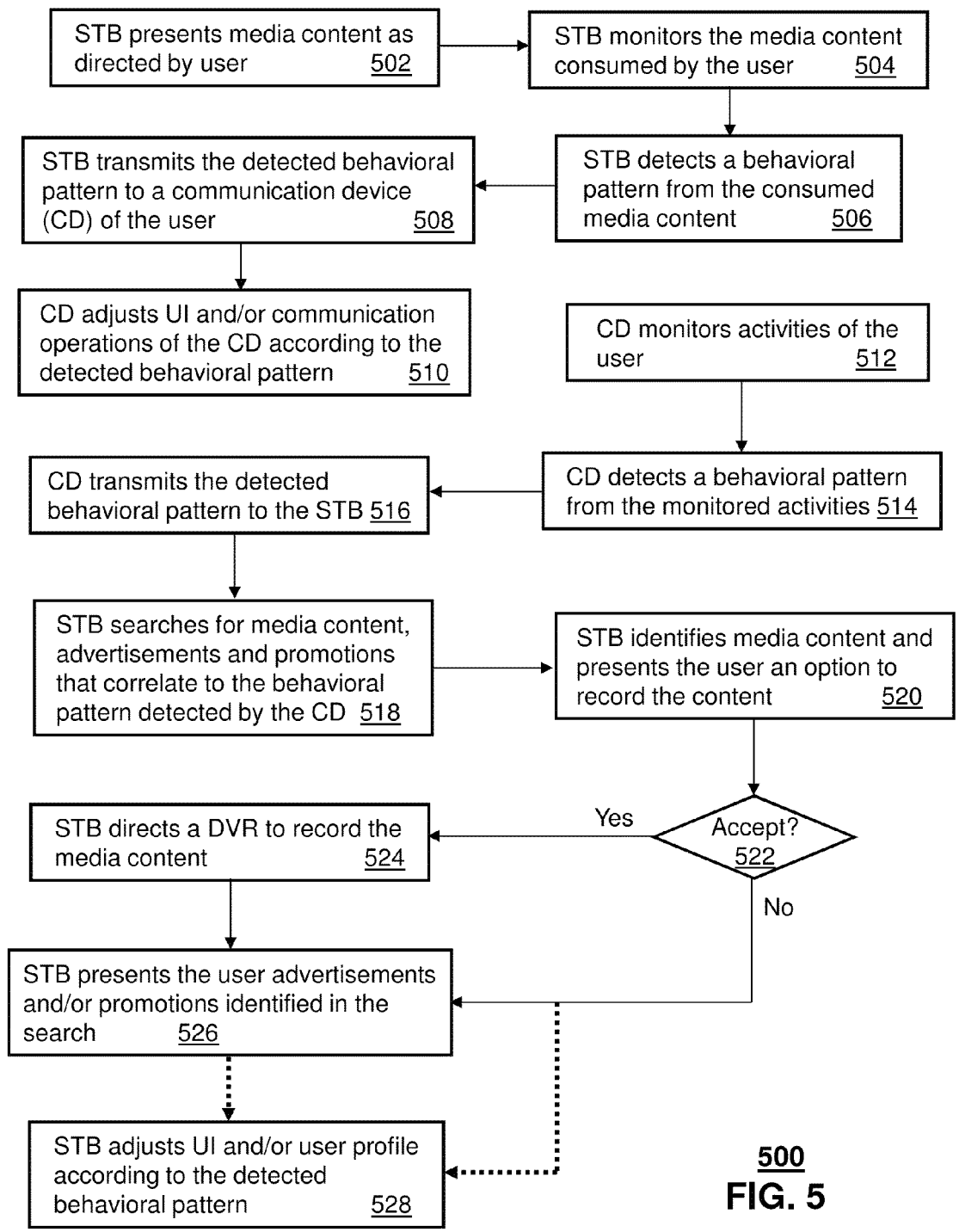
FIG. 5 depicts an illustrative embodiment of a method according to the present disclosure.
Figure 6:
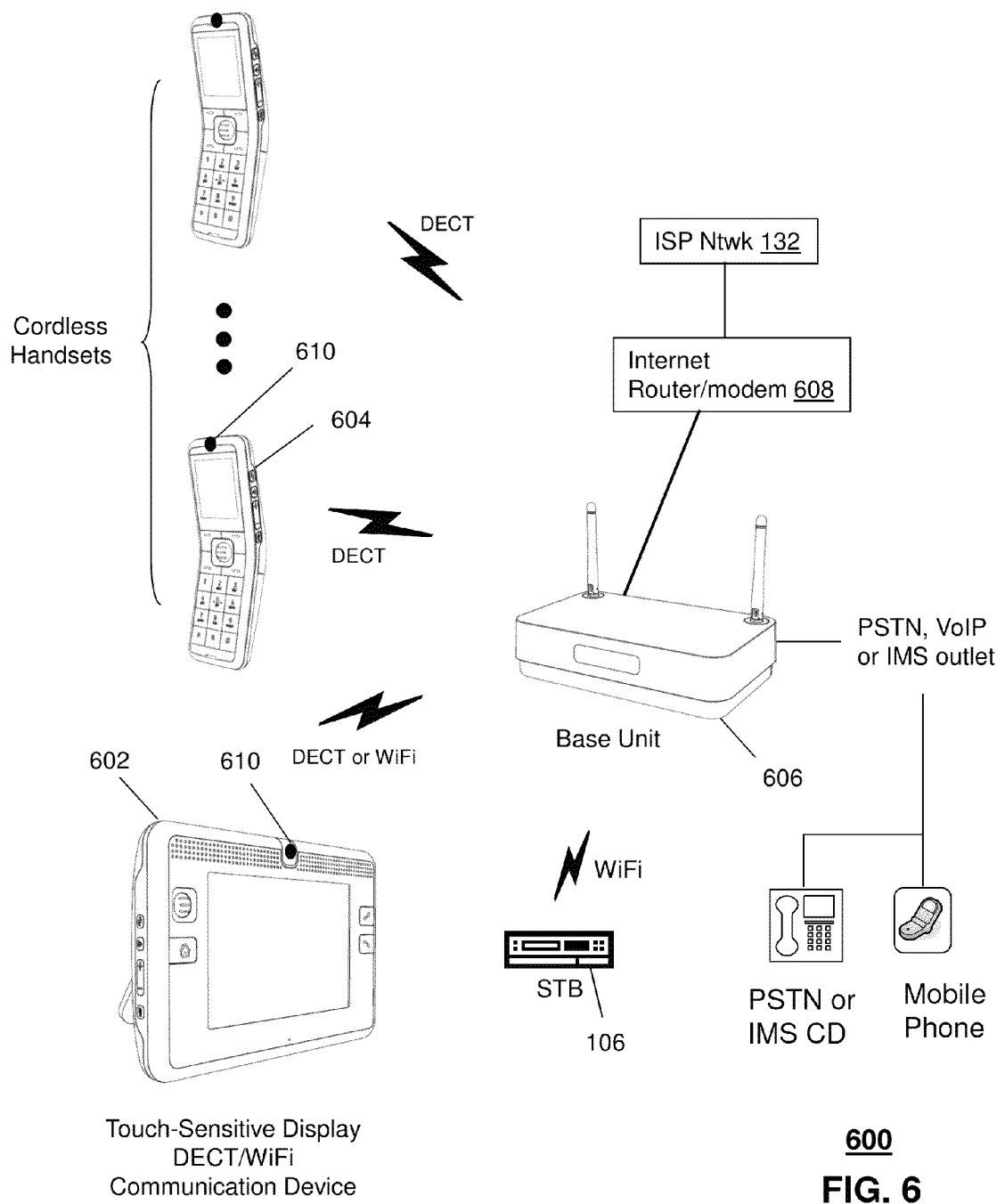
FIGS. 6-7 depict illustrative embodiments of the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures. The tablet 602 can also be communicatively coupled to the STB 106 by way of the base unit 606 using a WiFi air interface.

With the configuration of FIG. 6 in mind, method 500 can begin with step 502 in which a media processor such as the STB 106 of FIG. 1 is directed by a user by common means (e.g., controller 107) to present media content on a media presentation device such as a television. Media content in the present context can represent audio content, still or moving image content or both. In step 504, the STB 106 can be programmed to monitor the media content consumed by the user. The STB 106 can detect from the monitored consumed media content in step 506 a behavioral pattern of the user. The behavioral pattern can identify among other things media content of interest to the user, broadcast channels of interest to the user, and a temporal profile of the user's consumption of said content. Using common pattern recognition techniques, the STB 106 can also identify media content of interest by genre, actors, producers, directors, and so on.

For illustration purposes only, suppose a detected behavioral pattern of the user indicates that the user has an interest in college football, and typically selects football games on a specific broadcast channel (e.g., ESPN) which the user records on a DVR for viewing in the evening. The behavioral pattern can also indicate that the user likes action movies, specific actors or actresses, or directors. The behavioral pattern can further indicate that the user has an affinity for Jazz music of specific bands and/or performers. The STB 106 can be programmed with common statistical analysis software applications which can detect patterns such as described from the user's consumption of media content.

The STB 106 can be programmed to transmit in step 508 the detected pattern to one or more communication devices of the user. A communication device in the present context can represent a landline phone, a mobile phone, or a computer. Other communication devices are contemplated by the present disclosure. For illustration purposes only, suppose the communication device in the present instance is the tablet 602 of FIG. 6. In step 510, the tablet 602 can adjust a user interface (UI) presented thereby and/or its communication operations according to the detected behavioral pattern detected in step 506.

Figure 7:
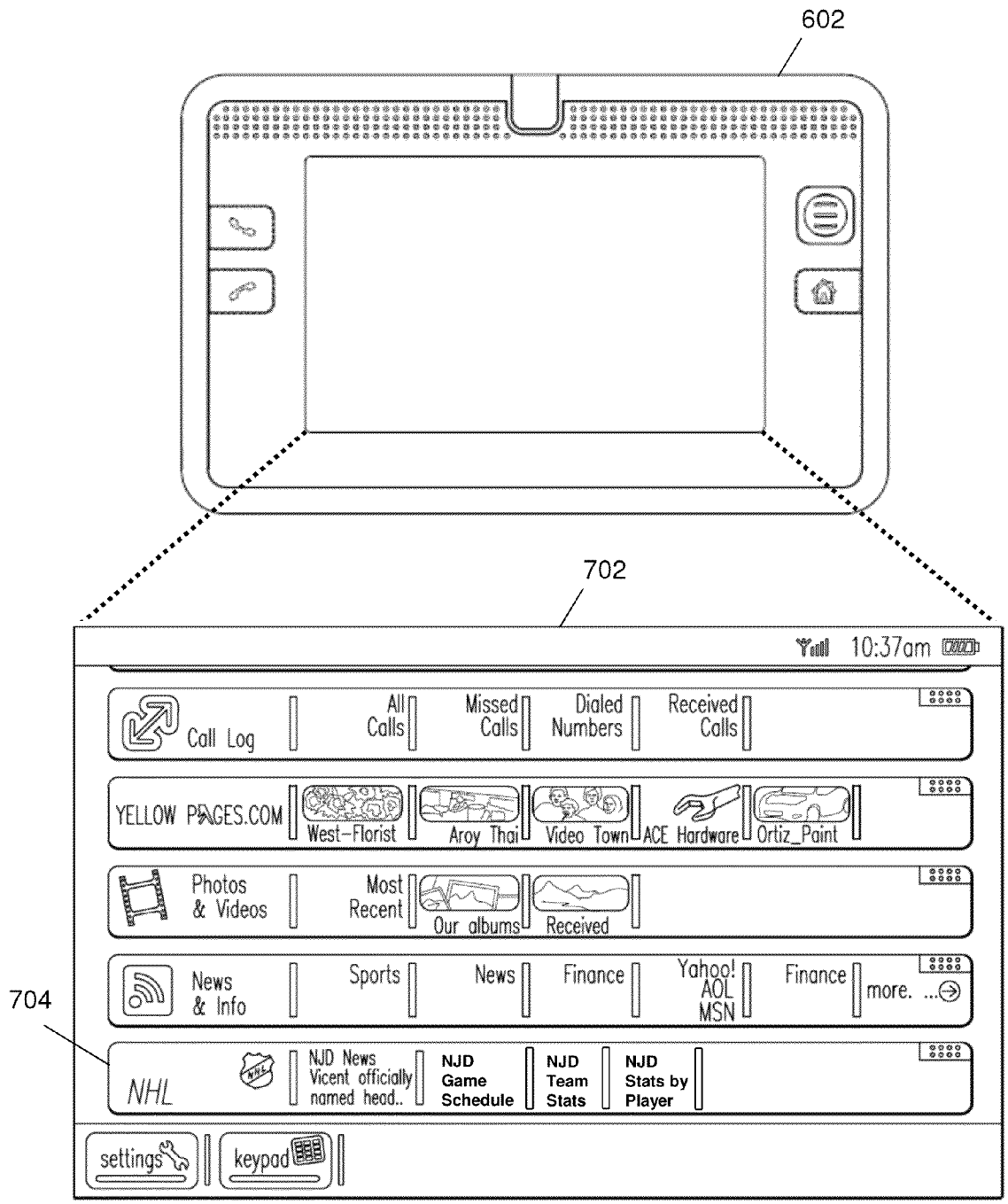

Suppose for instance that the behavioral pattern indicates that the user likes a particular type of sport and team such as the NJ Devils hockey team, and likes to monitor news related to the team coach. In FIG. 7, the tablet 602 can present a UI 702 with a plurality of toolbars for engaging in communication activities that can be selected by the user by way of the touch-sensitive display of the tablet. Based on the behavioral pattern provided in step 508, the tablet 602 can use this information to search for content related to the NJ Devils from a source such as a portal of the National Hockey League (NHL). Suppose in this illustration that the tablet 602 establishes communications with an NHL portal by way of the base unit 606 over a WiFi air interface. Further suppose that the NHL portal can provide news information about the NJ Devils (NJD) coach, a game schedule for the NJD, NJD team statistics, and NJD statistics by player.

With this information, the tablet 602 can be programmed in step 510 to adapt the UI 702 by adding a new toolbar 704 which it calls NHL with selectable buttons tailored for the user. The new toolbar 704 can have a selectable button with news about the NJD's coach, a button for the NJD game schedule, a button for the NJD team statistics, and a button for the NJD statistics by player. Selecting the toolbar 704 or any of the selectable sub-buttons can direct the tablet 602 to retrieve information from the NHL portal which can be presented to the user.

Steps 502-510 represent an embodiment where the STB 106 shares detected behavioral pattern data with the tablet 602. Steps 512-528 represent an embodiment where the tablet 602 shares detected behavioral pattern data with the STB 106. In step 512, the tablet 602 can be programmed to monitor activities of the user relating to how the user utilizes the tablet. Using common pattern recognition software, the tablet 602 can detect in step 514 a behavioral pattern from the monitored activities of the user. The tablet 602 can for example detect personal preferences or settings entered by the user which can indicate certain behavioral patterns. The tablet 602 can also detect that the user often selects the Sports button in the News & Info toolbar, and searches for statistics about the NJD. The tablet 602 can also detect that the user has created a custom toolbar for accessing the NHL portal with the custom buttons shown. In this illustration, it is the user that creates the NHL toolbar 704, not by automation as discussed in step 510.

Behavioral patterns such as these can be transmitted in step 516 to the STB 106. In step 518, the STB 106 can use this information to search for media content, advertisements and/or promotions that correlate to the behavioral pattern detected by the tablet 602. For instance, the STB 106 can search an electronic programming guide (EPG) for NHL games and specifically for games associated with the NJDs. Suppose that the STB 106 identifies in step 520 that the NJDs are being presented on ESPN. In the same step, the STB 106 can present the user the availability of NJD games on ESPN with an option to record the games by way of an DVR integrated in or operably coupled to the STB.

If the user accepts this option in step 522, the STB 106 can proceed to step 524 where it directs the DVR to record all games relating to the NJD on ESPN (as well as other channels if found). In step 526, the STB 106 can also present the user advertisements and/or promotions identified in the search which for example may be related to the NJDs (e.g., availability of tickets to be purchased at a local hockey stadium where the NJDs will be playing, apparel promoted by the NJDs, sports magazines, and so on). In addition to these steps, the STB 106 can adjust its UI and/or profile of the user to reflected the user's interest in the NJDs. The EPG for example can be customized so that the ESPN channel highlights the NJDs schedule. In another embodiment, the STB 106 can create a customized UI that presents NJD information supplied by for example the NHL portal. In this embodiment, the NHL portal can provide the STB 106 NJD videos, reruns, and so on in HDTV which may not be possible on the tablet 602.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that tablet 602 can be programmed to search for advertisements and promotions according to the behavioral pattern detected by the STB 106. In another embodiment, method 500 can be adapted so that the STB 106 shares user preferences with the tablet 602. In yet another embodiment, the tablet 602 and/or the STB 106 can adapt their operations in a multi-user environment so that the shared behavioral patterns of one user are adapted exclusively for the user and not the others who share the same device. Generally speaking, the present disclosure can be applied to any type of media device and communication device shared by the same user.

Other suitable modifications can be applied to the present disclosure without departing from the scope of the claims below. Accordingly, the reader is directed to the claims section for a fuller understanding of the breadth and scope of the present disclosure.

Figure 8:
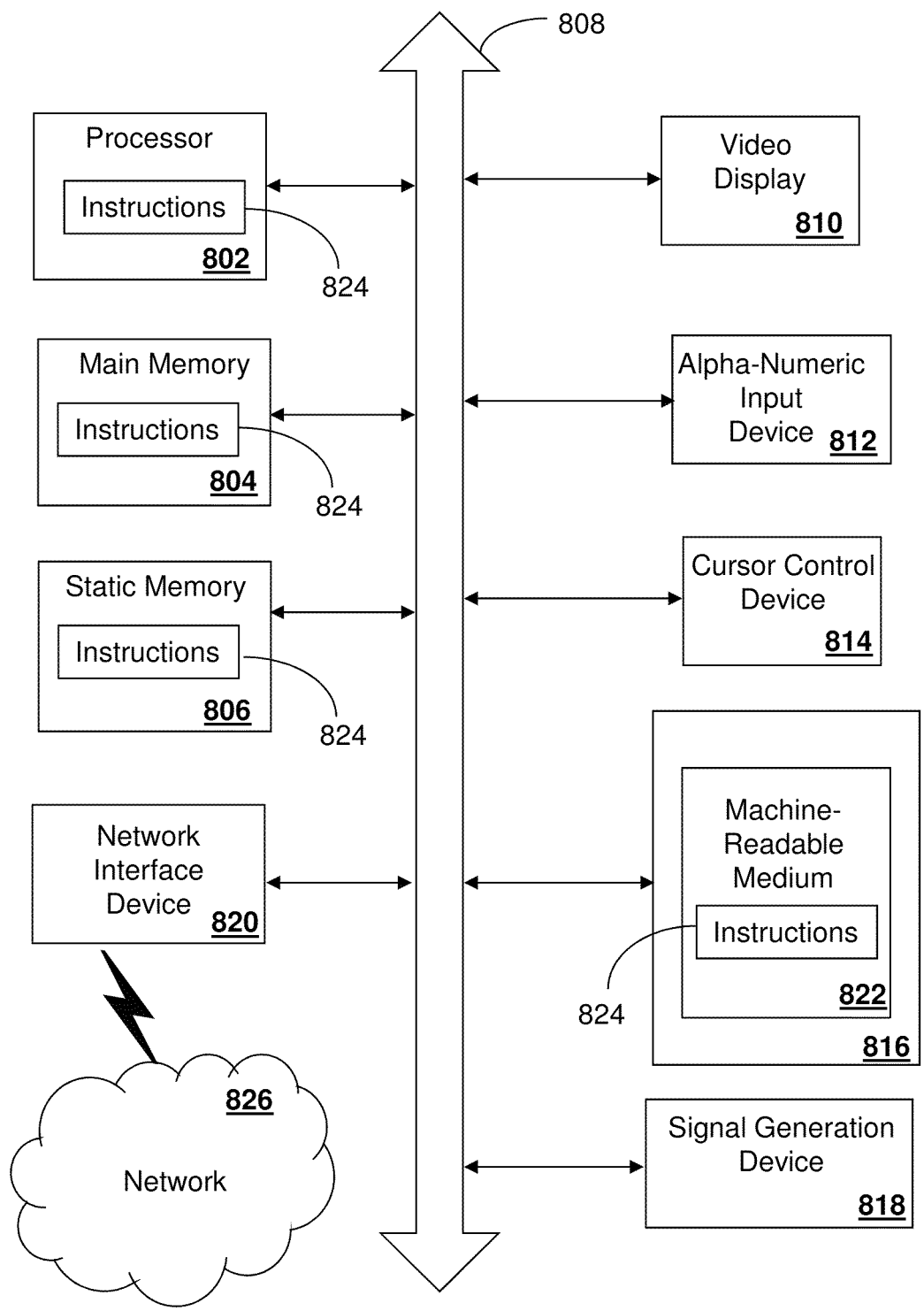
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device, comprising:
a memory to store executable instructions; and
a processor coupled to the memory, wherein, responsive to execution by the processor, the executable instructions facilitate performance of operations comprising:
monitoring first media content that is presented at a presentation device to identify behavioral patterns associated with a user;
detecting a first behavioral pattern of the user based on the monitoring of the first media content;
transmitting the first behavioral pattern to a communication device associated with the user for adjusting communication operations according to the first behavioral pattern to generate adjusted communication operations at the communication device, wherein the adjusted communication operations include a presentation of a toolbar at the communication device that includes a group of buttons, wherein each button of the group of buttons enables initiating a communication session with a different content source to access different content;
receiving from the communication device a second behavioral pattern that is determined by the communication device based on a monitored user interaction with at least some of the group of buttons;
searching an electronic programming guide according to the second behavioral pattern;
identifying second media content that is correlated to the second behavioral pattern based on the searching of the electronic programming guide; and
enabling access to the second media content.

2. The computing device of claim 1, wherein a first button of the group of buttons enables first access by the communication device to a first content source via a first web portal, wherein the enabling of the access to the second media content is via a second web portal from a second content source, and wherein the operations further comprise presenting the second media content at the presentation device.

3. The computing device of claim 1, wherein the first behavioral pattern identifies content of interest to the user based on genre, individuals associated with the content, broadcast channels of interest to the user, a temporal profile of consumption of the content by the user, or any combination thereof.

4. The computing device of claim 1, wherein the second behavioral pattern is determined by the communication device based in part on user preferences inputted by the user, and wherein the adjusted communication operations include adjusting a user profile stored at the communication device to indicate content preferences for the user.

5. The computing device of claim 1, wherein the processor is integrated with a set top box, and wherein the adjusted communication operations include adjusting a user profile for the user to indicate content preferences for the user.

6. The computing device of claim 1, wherein the communication device comprises a mobile phone, and wherein the monitoring of the first media content is utilized for targeting advertisement at the communication device.

7. The computing device of claim 1, wherein the adjusted communication operations are limited for use by the user and not for use by other users that share the communication device, wherein the processor is integrated with a set top box, and wherein the monitoring of the first media content is utilized for providing advertisements targeted to the user according to a subject matter of the first media content.

8. The computing device of claim 1, wherein the transmitting of the first behavioral pattern to the communication device causes a presentation of advertisements that is correlated to subject matter associated with the first behavioral pattern.

9. A method comprising:
receiving, by a communication device, a first behavioral pattern for a user of a computing device, the first behavioral pattern being received from the computing device based on monitoring first media content that is presented by the computing device;
adjusting, by the communication device, communication operations of the communication device according to the first behavioral pattern to generate adjusted communication operations;
presenting, by the communication device, a group of buttons according to the adjusted communication operations, wherein each button of the group of buttons enables initiating a communication session with a different content source to access different content;
limiting, by the communication device, use of the adjusted communication operations to the user and preventing use of the adjusted communication operations by other users that share the communication device,
monitoring, by the communication device, a user interaction with at least some of the group of buttons to determine a second behavioral pattern of the user;
transmitting, by the communication device, the second behavioral pattern to the computing device to enable the computing device to identify second media content that is correlated to the second behavioral pattern and to enable the computing device to provide access to the second media content.

10. The method of claim 9, wherein the second media content is identified by the computing device by searching an electronic programming guide according to the second behavioral pattern.

11. The method of claim 9, wherein the first behavioral pattern is utilized for selection of targeted advertising at the communication device.

12. The method of claim 9, wherein the first behavioral pattern is utilized for selection of targeted advertising at the computing device.

13. The method of claim 9, wherein the communication device comprises a mobile phone, wherein the computing device comprises a set top box.

14. The method of claim 9, comprising:
storing, by the communication device, a user profile; and
adjusting the user profile according to the second behavioral pattern to indicate content preferences.

15. The method of claim 9, wherein a first button of the group of buttons enables first access by the communication device to a first content source via a first web portal, wherein the access by the computing device to the second media content is enabled via a second web portal from a second content source.

16. A computer-readable storage device, comprising executable instructions which, responsive to being executed by a processor, facilitate performance of operations comprising:
detecting a first behavioral pattern of a user based on monitoring of first media content presented at a presentation device;
transmitting the first behavioral pattern to a communication device associated with the user for adjusting communication operations according to the first behavioral pattern to generate adjusted communication operations at the communication device, wherein the adjusted communication operations are limited for use by the user and not for use by other users that share the communication device, wherein the adjusted communication operations include a presentation of a group of buttons, wherein each button of the group of buttons enables initiating a communication session with a different content source to access different content;
receiving from the communication device a second behavioral pattern that is determined by the communication device based on a monitored user interaction with at least some of the group of buttons;
identifying second media content that is correlated to the second behavioral pattern;
identifying advertisements according to the first behavioral pattern; and
presenting the second media content and the advertisements at the presentation device.

17. The computer-readable storage device of claim 16, wherein the operations further comprise presenting an option to record the second media content by way of a digital media recorder.

18. The computer-readable storage device of claim 16, wherein the communication device is a mobile device, and wherein the processor operates in a set-top box, and wherein the operations further comprise searching an electronic programming guide according to the second behavioral pattern, wherein the identifying of the second media content that is correlated to the second behavioral pattern is based on searching of an electronic programming guide.

19. The computer-readable storage device of claim 16, wherein the first behavioral pattern identifies content of interest to the user based on genre, individuals associated with the content, broadcast channels of interest to the user, a temporal profile of consumption of the content by the user, or any combination thereof.

20. The computer-readable storage device of claim 16, wherein the second behavioral pattern is determined by the communication device based in part on user preferences established by the user, and wherein the adjusted communication operations include adjusting a user profile stored at the communication device to indicate content preferences.

* * * * *